United States Patent

Sugiki et al.

[11] Patent Number: 5,848,557
[45] Date of Patent: Dec. 15, 1998

[54] DRIVING DEVICE FOR TILTING STEERING EQUIPMENT

[75] Inventors: Akio Sugiki, Brussels, Belgium; Toshiyuki Sasaki, Kariya, Japan

[73] Assignee: Aisin Seiki Kabushiki Kaisha, Kariya, Japan

[21] Appl. No.: 705,269

[22] Filed: Aug. 29, 1996

[30] Foreign Application Priority Data

Aug. 29, 1995 [JP] Japan ................................. 7-220573

[51] Int. Cl.$^6$ ........................................................ B62D 1/18
[52] U.S. Cl. ............................ 74/493; 74/441; 403/362; 411/393; 411/432
[58] Field of Search ........................... 411/937.2, 928, 411/254, 255; 74/441, 440, 459, 493; 403/362

[56] References Cited

U.S. PATENT DOCUMENTS 4,633,732  1/1987  Nishikawa et al. .
5,520,416  5/1996  Singer, III et al. ................... 74/493 X

FOREIGN PATENT DOCUMENTS 1-68979  5/1989  Japan .
4-203650  7/1992  Japan ................................. 74/459

Primary Examiner—Richard M. Lorence
Assistant Examiner—William C. Joyce
Attorney, Agent, or Firm—Sughrue, Mion, Zinn, Macpeak & Seas, PLLC

[57] ABSTRACT

A driving device for tilting steering equipment comprises a screw shaft and a nut member. The nut member has a cylinder, a female screw member disposed in the cylinder, a hole formed in the cylinder facing the outer circumferential surface of the female screw member and a pressing member disposed in the hole. When the pressing member is pressed against the female screw member, the female screw member is bent toward the screw shaft. As a result, diametrical gaps between the male threads of the screw shaft and the female threads of the female screw member are removed in the area near where the pressing member presses the female screw member and on the side opposite the pressing member.

4 Claims, 5 Drawing Sheets

DRIVING DEVICE FOR TILTING STEERING EQUIPMENT

FIELD OF THE INVENTION

This invention relates to a driving device for tilting steering equipment comprising a screw shaft and a nut member.

BACKGROUND OF THE INVENTION

A conventional driving device for tilting steering equipment is disclosed in Japanese Utility Model laid-open publication No. H1-68979. This driving device has a screw shaft connected to a driven member and a nut member which is connected to a motor and engages with the screw shaft. The screw shaft connected to the driven member is axially moved by the rotation of the nut member. The nut member comprises a female screw member engaging with the screw shaft, a hole formed in the female screw member facing the outer circumferential surface of the screw shaft, and a pressing member disposed in the hole which presses the screw shaft in the radial direction thereof. This driving device decreases the gaps between the screw shaft and the female screw member with the pressure on the screw shaft generated by the pressing member.

Because the pressing member of this driving device presses the screw shaft directly against the internal circumference of the female screw member, the portions where gaps are removed are limited to the side opposite the pressing member.

SUMMARY OF THE INVENTION

The main object of this invention is to eliminate gaps between the screw shaft and the female screw member more efficiently and completely than with conventional means.

According to the present invention, a nut member comprises a cylinder, a female screw member formed within the cylinder engaging with a screw shaft, a hole formed in the cylinder facing the outer circumferential surface of the female screw member, and a pressing member disposed in the hole which presses the female screw member in the radial direction thereof so that the female screw member is bent toward the screw shaft.

According to the present invention, because the female screw member is pressed by the pressing member and bent toward the screw shaft, gaps are removed in the area where the pressing member presses the female screw member and the area opposite the pressing member. As a result, a driving device according to this invention can eliminate gaps in more locations than conventional means.

It is preferable that said cylinder has a pair of supporting members sharing the same axis at a right angle to said screw shaft connected to a driven member so that said screw shaft can swing on said driven member.

It is also preferable that said driven member is a steering wheel which is moved vertically by the axial movement of said nut member against said screw shaft. The axial movement of said nut member is caused by the rotation of said screw shaft.

The above and additional features of the present invention will be more apparent from the following detailed description of the preferred embodiment thereof when considered with reference to the attached drawings.

DETAILED DESCRIPTION OF THE INVENTION

Figure 1:
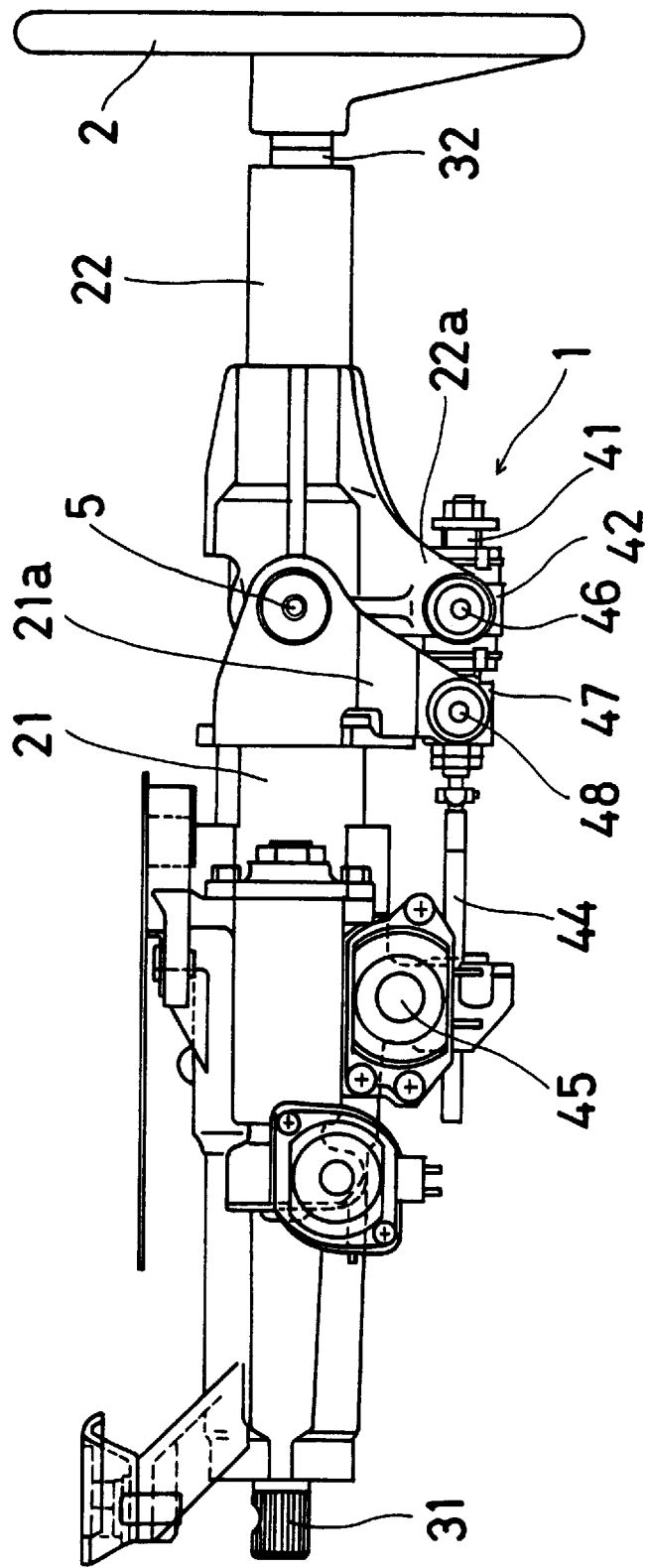
FIG. 1 is a side elevational view of tilting steering equipment with the driving device according to the present invention.
Figure 2:
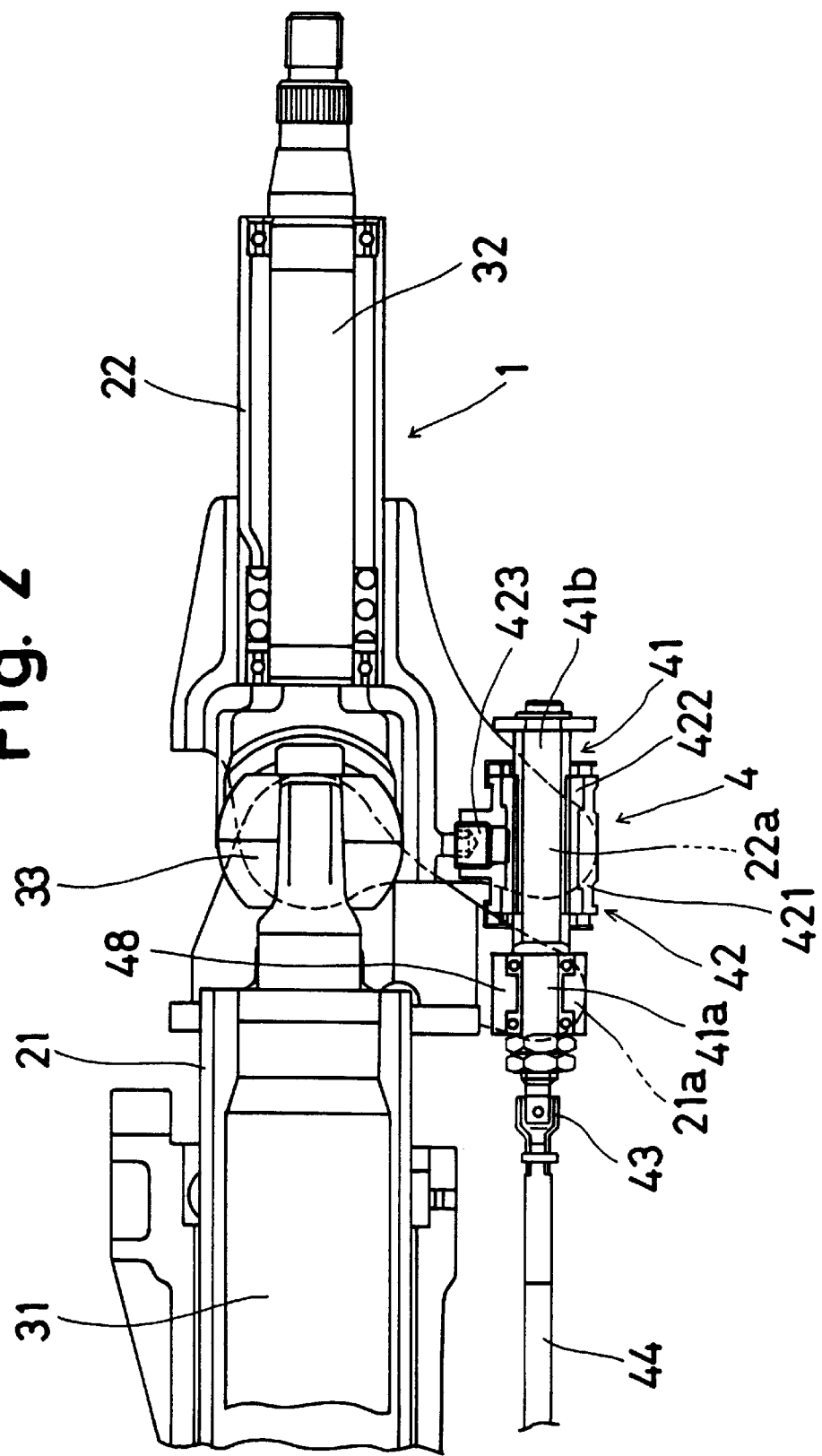
FIG. 2 is a partial sectional view of the tilting steering equipment with the driving device according to the present invention.

FIGS. 1 and 2 show tiltable steering equipment 1 for controlling the steering angle of the front wheels of a vehicle (not shown). The steering equipment 1 has an upper shaft 32 fixed to a steering wheel 2. The upper shaft 32 is rotatably supported by a movable column 22 which is swingably supported by a lower shaft 31 and a fixed column 21 by a pin 5. The fixed column 21 is fixed on the body of the vehicle (not shown). The lower shaft 31 is connected to the front wheels and is rotatably supported by the fixed column 21. The upper shaft 32 is connected to the lower shaft 31 by way of a universal joint 33 disposed on the same axis as the pin 5 which functions as the pivot axis for the swinging movement of the movable column 22 relative to the fixed column 21 so that the upper shaft 32 rotates with the lower shaft 31 and swings relative to the lower shaft 31.

A driving device 4, which makes the movable column 22 swing relative to the fixed column 21, is disposed between the fixed column 21 and the movable column 22. As the driving device 4 makes the movable column 22 swing relative to the fixed column 21, upper shaft 32 swings relative to the lower shaft 31. As a result, the steering wheel 2 tilts and the vertical position of the steering wheel 2 is adjusted.

Figure 3:
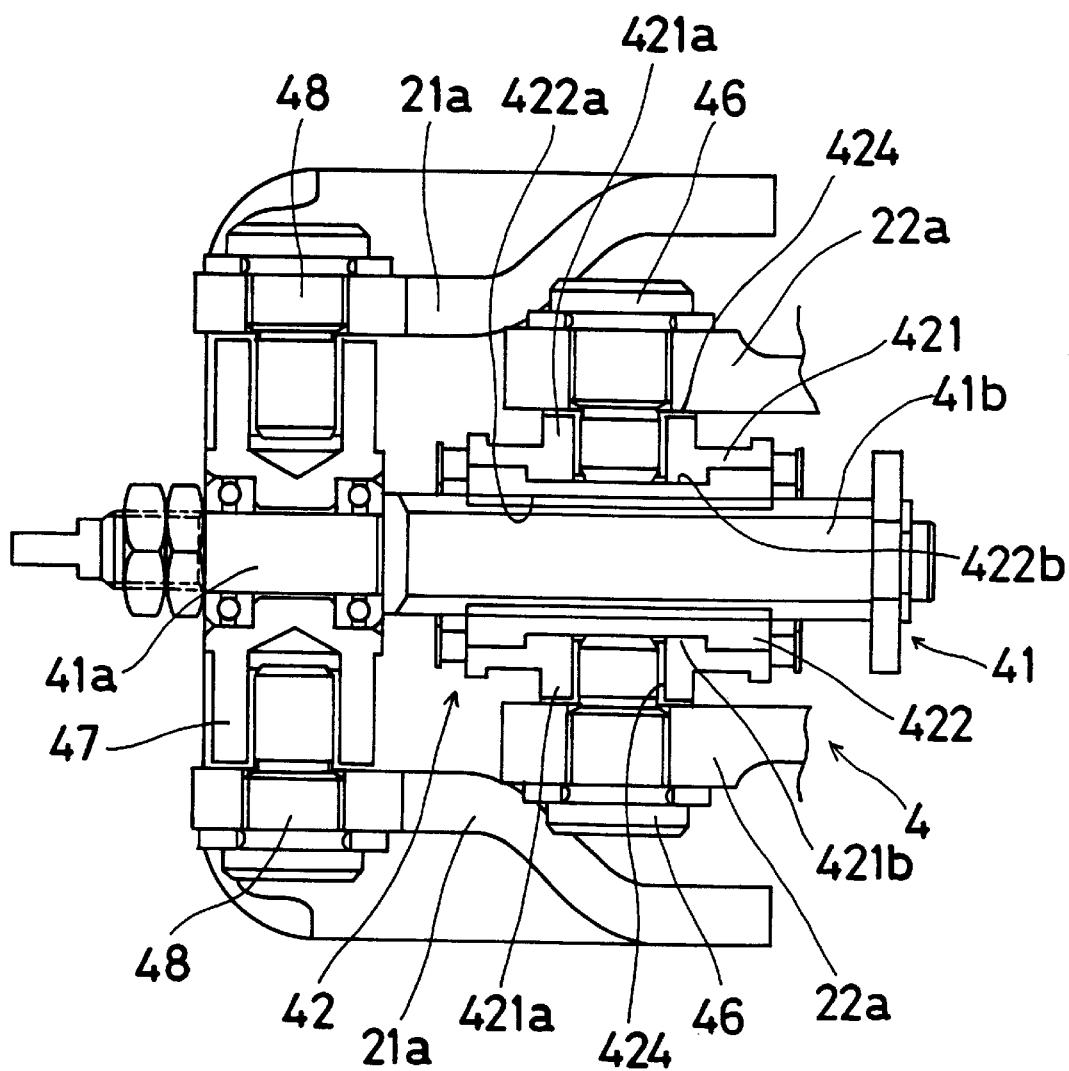
FIG. 3 is a cross sectional view of the driving device according to the present invention.

As shown in FIGS. 2 and 3, the driving device 4 has a screw shaft 41 and a nut member 42. The screw shaft 41 extends in the direction in which the steering equipment 1 extends. The screw shaft 41 is rotatably supported at one end in a supporting member 41a which in turn is supported by the fixed column 21 by way of a holder 47 between a pair of arms 21a. The holder 47 is supported by the arms 21a by a pair of pins 48 and the screw shaft 41 can swing on the pins 48 relative to the holder 47 and the arms 21a. The nut member 42 is threaded to engage with male threads 41b at the other end of the screw shaft 41 and is swingably and non-rotatably supported between a pair of arms 22a on the movable column 22. The screw shaft 41 is connected to a motor 45 by way of a coupling 43 and a connection rod 44. The nut member 42 moves axially relative to the screw shaft 41 by rotating the screw shaft 41 by the motor 45 and the movable column 22 swings relative to the fixed column 21. Because the screw shaft 41 swings on pins 48 and the nut member 42 swings with the screw shaft 41 when the movable column 22 swings relative to the fixed column 21, the movement of the nut member 42 and the movable column 22 is absorbed.

The nut member comprises a cylinder 421 and a female screw member 422. The cylinder 421 is made of metal. A pair of bosses 421a are formed on the same axis on the outer circumferential surface of the cylinder 421 and an axially extending convex part 421b is formed on the internal circumference of cylinder 421. The female screw member 422 is made of resin and shaped like a cylinder. Female threads 422a are formed on the internal circumference of the female screw member 422 and an axially extending concave part 422b is formed on the outer circumferential surface of the female screw member 422. The female screw member 422 is disposed within the cylinder 421 and the engagement of concave part 422b and the convex part 421b prevents the female screw member 422 from moving axially relative to the cylinder 421. The cylinder 421 is supported by the arm 22a of the movable column 22 by a pair of bolts 46 inserted in each boss 421a, respectively, through a bushing 424. It is also possible to make the arms 22a of the movable column 22 support the cylinder 421 by forming a pair of axles on the cylinder 421 which are inserted and fixed in the pair of arms 22a by a nut or by hammering one end of each axle flat.

Figure 4:
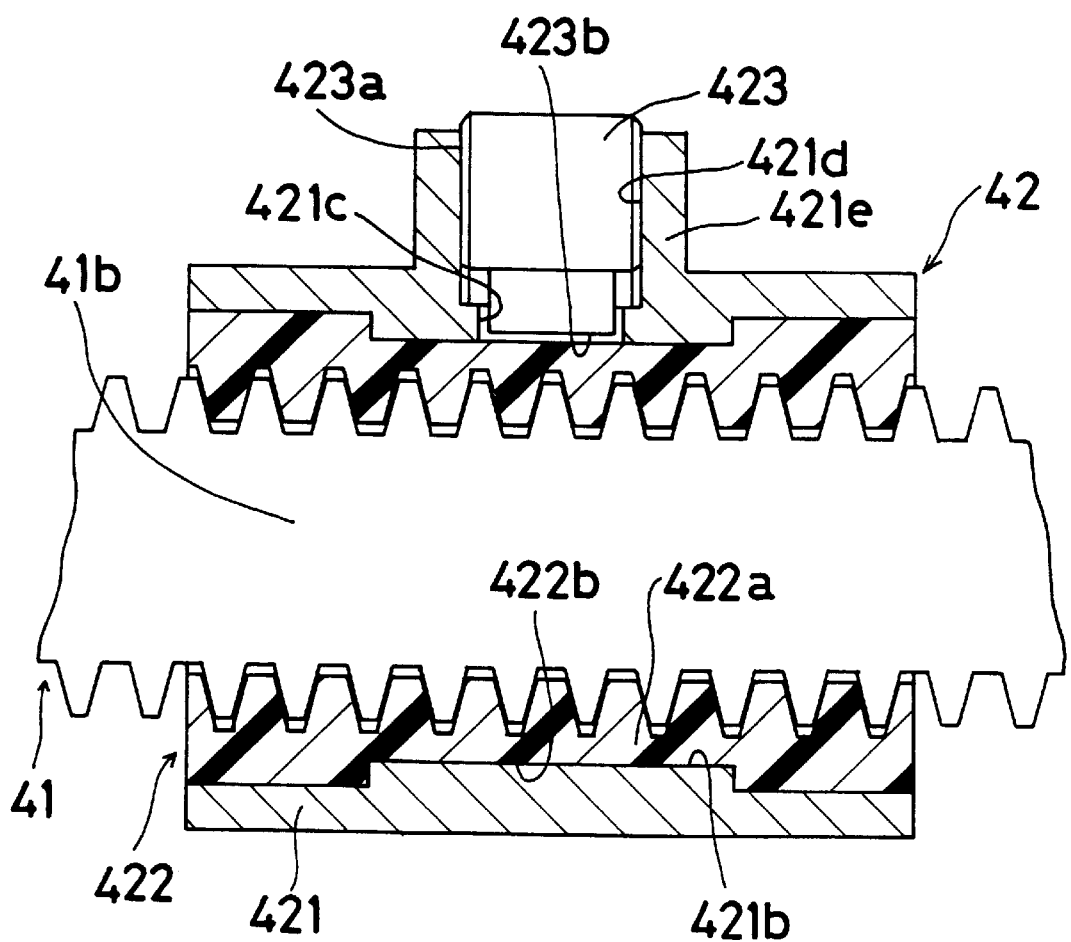
FIG. 4 is an expanded sectional view of the driving device according to the present invention.
Figure 5:
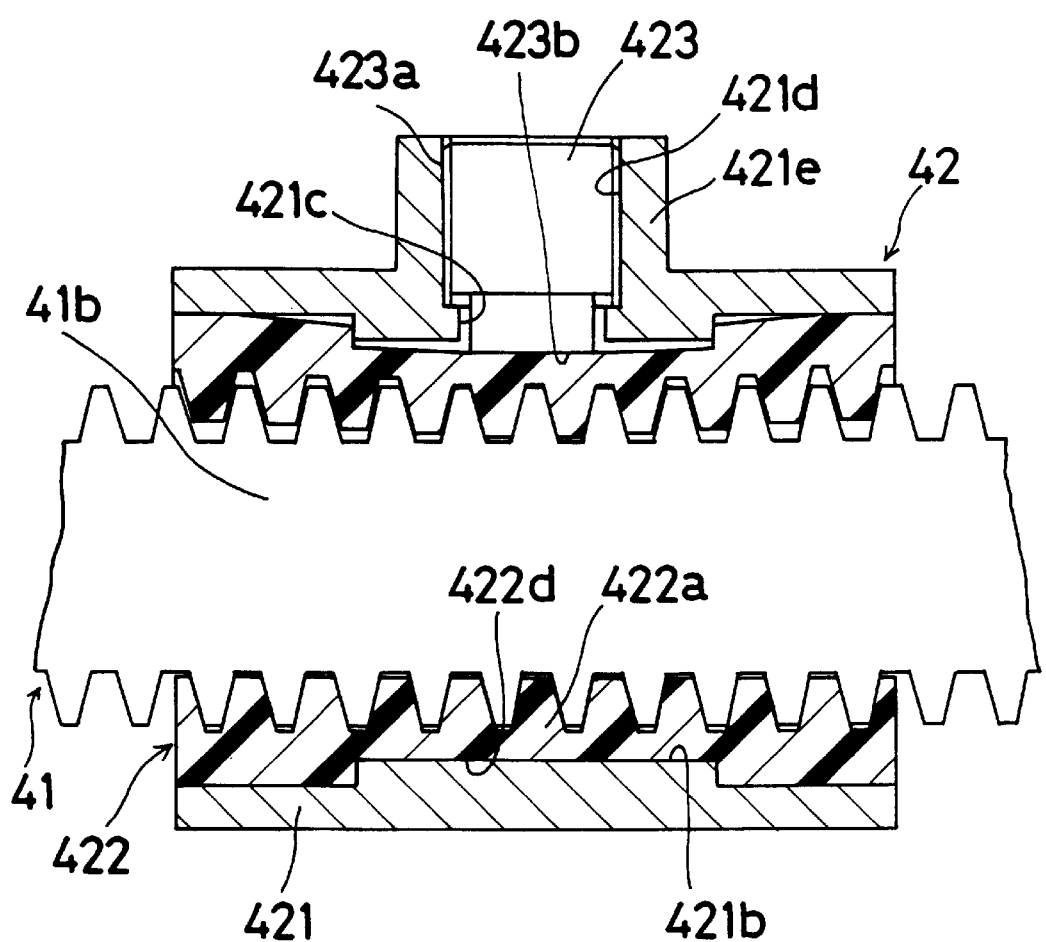
FIG. 5 shows the operation of the driving device according to the present invention.

As shown in FIGS. 4 and 5, a hole 421c at a right angle to the axis of the boss 421a is formed in the cylinder 421. The hole 421c faces the female screw member 422 in the middle of the length of the cylinder 421. A flange wall which has female threads 421d inside is formed around the hole 421c. A pressing member 423 is disposed in the hole 421c. The outer circumferential surface of the pressing member 423 has male threads engaging with the female threads 421d. The pressing member 423 has a pressing surface 423b which faces the outer circumferential surface of the female screw member 422 at one end.

The operation of the present embodiment is explained as follows:

FIG. 4 shows the state in which the outer circumferential surface of the female screw member 422 is not pressed by the pressing member 423. There are gaps between the male threads 41b of the screw shaft 41 and the female threads 422a of the female screw member 422 of the nut member 42 in the axial and radial directions. When the pressing member 423 is rotated in this state, the pressing member 423 advances toward the female screw member 422 with the engagement of the male threads 423a and the female threads 421d. The pressing surface 423b of the pressing member 423 is pressed against the female screw member 422 in the radial direction thereof, and as FIG. 5 shows, the part of the female member 422 pressed by the pressing member 423 is bent toward the screw shaft 41. This action removes the diametrical gaps between the male threads 41b and the female threads 422a in the portion pressed by the pressing member 423 and the portion opposite to the pressing member 423.

While the invention has been particularly shown and described with reference to preferred embodiments thereof, it will be understood by those in the art that the foregoing and other changes in form and details may be made therein without departing from the spirit and scope of the invention.

What is claimed is:

1. A driving device for tilting steering equipment comprising:

a fixed column;

a movable column swingably connected to the fixed column;

a screw shaft connected to a motor;

support means for supporting the screw shaft for tilting movement relative to the fixed column;

a nut member having a cylinder connected to the movable column, a female screw member disposed in said cylinder in engagement with said screw shaft, a single hole formed substantially midway between the ends of said cylinder and opening to an outer circumferential surface of said female screw member, and a pressing member disposed in said hole facing the outer circumferential surface of said female screw member to press said female screw member in the radial direction thereof and bend said female screw member wherein said pressing member reduces gaps between said screw shaft and said female screw member to keep said screw shaft in parallel to said cylinder.

2. A driving device for tilting steering equipment as claimed in claim 1, wherein one of said screw shaft and said nut member is moved axially by the rotation of the other of said screw shaft and said nut member.

3. A driving device for tilting steering equipment as claimed in claim 1, wherein said cylinder has a pair of supporting members sharing the same axis at a right angle to said screw shaft.

4. A driving device for tilting steering equipment as claimed in claim 1, wherein said driven member is a steering wheel movable vertically by axial movement of said nut member relative to said screw shaft upon rotation of said screw shaft.

* * * * *